UNITED STATES PATENT OFFICE.

SPENCER B. NEWBERRY AND HARVEY N. BARRETT, OF BAYBRIDGE, OHIO.

PHOSPHATE COMPOSITION AND PROCESS OF CALCINING PHOSPHATES.

1,162,802.   Specification of Letters Patent.   Patented Dec. 7, 1915.

No Drawing.   Application filed November 25, 1912. Serial No. 733,331.

*To all whom it may concern:*

Be it known that we, SPENCER B. NEWBERRY and HARVEY N. BARRETT, citizens of the United States, residing at Baybridge, in the county of Erie and State of Ohio, have invented a certain new and useful Improvement in Phosphate Compositions and Processes of Calcining Phosphates, of which the following is a specification.

This invention relates to the conversion of natural phosphate of lime to citrate-soluble form by calcination with a small proportion of alkali-metal oxid.

We have found that tricalcium phosphate, commonly called phosphate of lime and occurring in nature as phosphate rock, may be easily and practically completely converted into citrate-soluble form by mixing the phosphate with a very small percentage of its weight, as for example, five to twelve per cent. of alkali metal oxid, and heating the mixture at high temperature. It is to be understood that these figures are given merely as an illustration of proportions which we have found suitable and that the amounts may vary greatly from those we have suggested. The alkali-metal oxid may be added to the phosphate in the form of oxid or peroxid, but more conveniently and cheaply in the form of certain alkali-metal compounds which are converted into oxid under certain physical conditions of calcination which are fully described and set forth herein.

It is well known that the common compounds of the alkali-metals, as sodium or potassium hydroxid, nitrate, sulfate, carbonate, etc., are only imperfectly and with great difficulty decomposed by heating alone. In fact, at temperatures sufficiently high to drive off water or acid constituents and leave a residue of oxid, the oxid itself is practically completely volatilized. We have found that when the above-mentioned alkali-metal compounds are heated to high temperature in the presence of phosphate of lime, under ordinary conditions, as in a closed vessel or out of contact with hot gases, the mixture fuses into dense masses and the alkali-metal compounds remain almost entirely undecomposed. If, on the other hand, the mixture is brought into a highly porous condition, so as to be freely penetrated by moving gases, and a rapid current of gases at high temperature is caused to circulate through the porous mixture, the alkali-metal compound is quickly and completely decomposed with evolution of its more volatile constitutents, as water or acid oxids leaving a residue of alkali-metal oxid. The residual oxid combines, probably as soon as formed, with the phosphate of lime, and aids in rendering it citrate-soluble; usually a portion of the alkali-metal oxid is also volatilized, leaving as the final product of the calcination a citrate-soluble calcium phosphate usually containing from three to five per cent. by weight of alkali-metal oxid. It is to be understood that this outline of the changes which take place is merely suggested as probably correct so far as our present knowledge extends, and that the actual chemical reactions involved in the process have not yet been fully determined. From the fact that this alkali-metal oxid cannot be extracted from the product by treating with water it is probable that the alkali remaining exists in the form of calcium-alkali phosphate. The alkali-metal oxid may, however, be practically completely volatilized by continued and intense heat, without injuring the citrate-solubility of the product.

It will be noted that the most important conditions required for the rapid and substantially complete conversion of the alkali-metal compounds into oxid and of the phosphate into citrate soluble condition are, (1), a highly porous and permeable condition of the mixture, and (2), the passage of a rapid current of highly heated gases through all parts of the mixture and in intimate contact therewith. The more completely these conditions are realized, the more efficiently and economically the desired result will be produced.

The highly porous condition of the mixture may be described as a honey-combed or pumice-like structure. This may be secured by any one of many possible mechanical methods of treatment. We have found a simple method of reaching the desired porous condition to consist in finely pulverizing and mixing the phosphate and alkali-metal compound, adding water to the consistency of a thick liquid mud, and spreading this mixture in thin layers on hot surfaces of metal or fire-brick. When so treated the mixture swells up to nearly double its initial thickness and dries quickly into a spongy mass, exceedingly light and porous, and remains detached from the metal or fire-brick surface.

The drying apparatus as just described may be heated by the hot gases discharged from the calcining kiln or may form part of the kiln itself, or may be heated by an independent fire.

If it is desired to carry on the entire process of drying, rendering porous and calcining in a single operation, this can be accomplished by using a comparatively short rotary kiln, lined throughout with fire brick or other refractory material, and so adjusting the heating that the lining at the upper or feed end shall be kept at a bright red heat. The wet mixture is then fed onto this red-hot lining, either intermittently or in a regulated stream, so that it shall quickly be rendered porous and shall detach itself from the heated surface. These conditions distinguish the process clearly from the ordinary method of burning wet cement mixtures. In cement manufacture the kilns are made relatively long for the sake of economy of fuel, and when in operation are always at a low temperature at the upper end, the zone of red heat rarely extending more than half the length of the kiln. An attempt to calcine phosphate mixtures in the same manner would result in complete failure, since the all important condition of porosity of the material would not be produced. However, it is of course practicable to use ordinary cement kilns for the calcination provided the mixture is previously rendered porous and dried in a separate operation, and fed into the kiln in a dry state. This method is, in fact, probably more economical than that of combined drying and burning.

Another method of treatment which we have found effective in imparting to the phosphate mixture a highly porous structure consists in spreading the mixture in the form of a thick mud upon shelves or pans and exposing these in a closed vessel to the action of superheated steam.

The calcination of the porous mixture of phosphate and alkali-metal compound may be effected in a furnace of any type in which the necessary high temperature and free circulation of a rapid current of hot gases through the material may be secured. The type of furnace most economical of labor and repair cost is doubtless a revolving cylinder, inclined at a pitch of one (1) inch or more per foot, and heated internally by a flame or flames of coal-dust, oil or gas, blown into the kiln at the discharge end by a strong blast of air. We have found coal-dust a less satisfactory fuel than oil or gas, owing to the tendency of the ash of the coal to flux with calcined material, thus decreasing its porosity and causing it to adhere to the kiln lining and to fail to descend regularly. The porous mixture is introduced at the upper end of the kiln, and the calcined product continually discharged at the lower end. A smaller consumption of fuel may however be secured in a kiln of the vertical continuous type, in which the material and fuel are periodically introduced at the top and the calcined producet withdrawn at the bottom. Or the vertical kiln may be heated by separate fires, the flame from which passes up through the material. In either method of firing a strong pressure of air blast or strong stack-draft is required, to force or draw the hot gases in a rapid current through the charge. It is to be understood that we do not limit our invention to the use of any particular type of kiln or furnace, as we recognize that any form of calcining apparatus in which rapid circulation of gases at the proper high temperature through the porous material may be secured will produce the desired result.

Whatever type of furnace is adopted, the operation of calcination proceeds as follows: The porous mixture of phosphate and alkali-metal compound is brought into contact with the rapid stream of highly heated gases passing through the furnace, and is traversed and penetrated by these gases. As soon as the mixture reaches a bright red heat of about 2000° F. it begins to evolve the volatile constituents of the alkali-metal compound, and by this evolution is prevented from fusing and maintained in a porous condition. It is of course to be understood that the prevention of fusion and maintenance of porosity of the mixture may probably be secured by other conditions than those we have described, or by the addition of other suitable materials. Under these conditions the various alkali-metal compounds are decomposed as follows: The hydroxids lose water, the carbonates lose carbon dioxid, the sulfates lose sulfur dioxid and oxygen, the nitrates lose oxids of nitrogen, etc., and in all these cases a residue of alkali metal oxid is left, which enters into combination with the constituents of the phosphate. It is important to note that this decomposition of the alkali-metal compounds takes place either not at all or to very slight extent unless the mixture heated is in porous condition and is freely traversed and permeated by the hot gases. Under these conditions the volatile constituents may be said to be "blown out" of the compounds, and this action, with separation of alkali-metal oxid, has, we believe, not heretofore been noted by experimenters.

Simultaneously with the expulsion of the volatile constituents of the alkali-metal compound the citrate-soluble phosphoric acid steadily increases, and when practically all the alkali-metal compound is converted into oxid about half the phosphate is rendered citrate-soluble. This conversion continues during the last stage of the calcination, at a temperature of 2500° F. or over, and at the same time a portion of the alkali-metal oxid is also volatilized. The product is finally discharged in the form of porous, spongy masses, extremely light and soft, closely resembling the raw material when first introduced into the kiln, but containing practically all its phosphoric acid in citrate-soluble form.

It will be understood that in case the alkali-metal sulfate or nitrate is employed, the sulfur dioxid or oxids of nitrogen evolved may be condensed and recovered by well-known methods, and that the alkali-metal oxid volatilized in the calcination may also be recovered and used as an ingredient of the mixture or otherwise employed.

A further result of the rapid drying set forth in my application is that the sodium compound by such rapid drying prevented from separating out in the form of crystals of considerable size and thus a material is obtained in which there is a uniform distribution of the reagent from the beginning to the end of the process.

Claims:

1. The process of making fertilizer by pulverizing natural phosphate of lime, mixing the phosphate with an alkali-metal compound convertible by calcination into alkali-metal oxid, imparting to the mixture a porous and permeable structure, exposing the porous mixture to heat in such manner that it shall be penetrated and traversed by a rapid current of hot gases until the alkali-metal compound is substantially converted into alkali-metal oxid with evolution of the volatile constituents of the alkali-metal compound and continuing the calcination until the phosphate has been rendered substantially citrate-soluble.

2. The process of making fertilizer by pulverizing natural phosphate of lime, mixing the phosphate with an alkali-metal compound convertible by calcination into alkali-metal oxid, imparting to the mixture a porous and permeable structure, exposing the porous mixture to heat in such manner that it shall be penetrated and traversed by a rapid current of hot gases until the alkali-metal compound is substantially converted into alkali-metal oxid with evolution of the volatile constituents of the alkali-metal compound, and continuing the calcination until the alkali-metal oxid is in part expelled and the phosphate is rendered substantially citrate-soluble.

3. The process of making fertilizer by pulverizing natural phosphate of lime, mixing the phosphate with enough alkali-metal compound convertible by calcination into alkali-metal oxid to yield an amount of alkali-metal oxid equal to 5 to 12 per cent. of the weight of the phosphate, imparting to the mixture a porous and permeable structure, exposing the porous mixture to heat in such manner that it shall be penetrated and traversed by a rapid current of hot gases until the alkali-metal compound is substantially converted into alkali-metal oxid with evolution of the volatile constituents of the alkali-metal compound, and continuing the calcination until the alkali-metal oxid is in part expelled and the phosphate is rendered substantially citrate-soluble.

4. The process of making fertilizer by pulverizing natural phosphate of lime, mixing the phosphate with enough alkali-metal compound convertible by calcination into alkali-metal oxid to yield an amount of alkali-metal oxid equal to five to twelve per cent. of the weight of the phosphate, imparting to the mixture a porous and permeable structure, exposing the porous mixture to a heat of 2000° to 2700° F. in such manner that the mixture shall be penetrated and traversed by a rapid current of hot gases until the alkali-metal compound is substantially converted into alkali-metal oxid with evolution of the volatile constituents of the alkali-metal compound, and continuing the calcination until the alkali-metal oxid is in part expelled and the phosphate is rendered substantially citrate-soluble.

5. The process of making fertilizer by pulverizing natural phosphate of lime, mixing the phosphate with an alkali-metal compound convertible by calcination into alkali-metal oxid, imparting to the mixture a porous and permeable structure, exposing the porous mixture to heat in such manner that it shall be penetrated and traversed by a rapid current of hot gases and continuing the calcination until the phosphate has been rendered substantially citrate soluble.

6. The process of treating phosphatic material in order to render insoluble phosphates available which consists in preparing a finely divided mixture consisting of said material, a sodium salt and water; drying said mixture without permitting said salt to crystallize to a substantial extent; and then calcining the dried mixture to render soluble the contained phosphates, substantially as described.

7. The process of changing insoluble phosphates into the soluble form which consists in preparing a finely divided mixture of tricalcium phosphate material, a sodium salt and water; drying said mixture so rapidly that no substantial crystallization of a contained soluble salt will take place; heating said dried mixture to a temperature sufficient to effect the desired transformation; and subsequently finely dividing the calcined mixture, substantially as described.

8. The process of changing the insoluble phosphates in phosphate rock into the soluble form which consists in finely dividing said rock, mixing sodium sulfate therewith; treating the mixture with water; drying the wet mixture thus produced so quickly as to prevent said sodium sulfate from crystallizing to an appreciable extent; and finally calcining said dried mixture at a temperature sufficient to produce the desired change, substantially as described.

9. The herein new composition of matter suitable for calcining consisting of a thoroughly dried mixture of divided phosphate rock and a soluble sodium salt substantially free from soluble crystals, substantially as described.

Signed at Baybridge, Ohio, this 21st day of November, 1912.

SPENCER B. NEWBERRY.
HARVEY N. BARRETT.

Witnesses:
ARTHUR C. NEWBERRY,
IRVIN H. NUBER.